(12) United States Patent
Sakurai

(10) Patent No.: US 8,780,319 B2
(45) Date of Patent: Jul. 15, 2014

(54) WAVELENGTH SELECTIVE OPTICAL SWITCH

(71) Applicant: Santec Corporation, Aichi (JP)

(72) Inventor: Yasuki Sakurai, Aichi (JP)

(73) Assignee: Santec Corporation, Aichi (JP)

( * ) Notice: Subject to any disclaimer, the term of this patent is extended or adjusted under 35 U.S.C. 154(b) by 0 days.

(21) Appl. No.: 13/935,783

(22) Filed: Jul. 5, 2013

(65) Prior Publication Data

US 2014/0016079 A1 Jan. 16, 2014

(30) Foreign Application Priority Data

Jul. 13, 2012 (JP) ................................ 2012-158381

(51) Int. Cl.
*G02F 1/13* (2006.01)

(52) U.S. Cl.
USPC ............................................ 349/196; 385/18

(58) Field of Classification Search
None
See application file for complete search history.

(56) References Cited

U.S. PATENT DOCUMENTS

| 7,397,980 B2 | 7/2008 | Frisken |
| 2006/0067611 A1 | 3/2006 | Frisken et al. |
| 2012/0128355 A1* | 5/2012 | Sakurai ........................ 398/48 |

FOREIGN PATENT DOCUMENTS

JP 2012-108436 A 6/2012

OTHER PUBLICATIONS

Patent Abstracts of Japan, Publication No. 2012-108436, Published on Jun. 7, 2012, 1 page.

* cited by examiner

*Primary Examiner* — Thanh-Nhan P Nguyen
(74) *Attorney, Agent, or Firm* — Osha Liang LLP

(57) ABSTRACT

A wavelength selective optical switch includes an incidence/emergence unit that includes an input port at which signal light made up of light of numerous wavelengths is incident and an output port at which light signals of selected wavelengths are emergent, a wavelength dispersion element that spatially disperses signal light according to a wavelength of the signal light, and synthesizes reflected light, a condenser element that condenses light dispersed by the wavelength dispersion element on a two-dimensional plane, a space phase modulator arranged so as to receive incident light deployed on an xy plane made up of an x-axis direction deployed according to wavelength and a y-axis direction orthogonal to the x-axis direction, and having numerous pixels arranged in a lattice on the xy plane, and a space phase modulator drive unit.

19 Claims, 12 Drawing Sheets

WAVELENGTH SELECTIVE OPTICAL SWITCH

TECHNICAL FIELD

The present invention relates generally to a wavelength selective optical switch which is used in nodes of optical communications systems and the like.

BACKGROUND ART

Wavelength division multiplexing optical communications technology is used in the high-speed large-capacity optical networks that support the high level of data communications needed in today's society. There has been progression in the introduction of reconfigurable optical add drop multiplexers (ROADM devices) having reconfigurable add and drop functions at optical nodes, which are equivalent to branches in an optical network. To realize ROADM devices, wavelength selective switches (WSS), which can switch any wavelength in any direction, have gained attention. Light beam deflection elements which select a wavelength and deflect light beams to a desired output port have been used in wavelength selective switches. In Patent References 1, 2 and 3, something which utilizes the diffraction phenomenon by liquid crystal on silicon (LCOS) elements is proposed.

On the other hand, a great deal of research and development have been conducted regarding new modulation formats and increasing of transmission rates to respond to demand for transmission capacity in recent years, and optical networks have become more complex. To achieve the optimal filtering for the transmission rate and modulation format of each optical signal in such optical networks, dynamic control functions such as shifting of the median wavelength of the passband and enlargement and contraction of the passband are required in addition to conventional wavelength selection functions.

These functions can be realized by using high-precision LCOS elements or the like, in which a plurality of pixels are assigned to the channels of a WDM signal—that is, different wavelengths of light—and by using a multi-level optical phased array for light beam deflection.

PATENT REFERENCES

[Patent Reference 1] US 2006/0067611 A1
[Patent Reference 2] U.S. Pat. No. 7,397,980 B2
[Patent Reference 3] JP-A-2012-108436

However, in cases where this kind of wavelength selective optical switch is used for a multiplexer which collects light, made up of a plurality of input ports collected at one port, light of the unselected ports may leak to the output port. For example, in FIG. 1(a), wavelength selective optical switch 101 is an optical switch having a plurality of input ports 102-1 through 102-N and one output port 103. In this case, there is the drawback that even if the wavelength of, for example, input port 102-1 is selected, part of the signal applied to the another input port, such as 102-N, for example, ends up being output to the output port 103.

Similarly, as shown in FIG. 1(b), a wavelength selective optical switch 111 is an optical switch having one input port 112 and a plurality of output ports 113-1 through 113-N. In this case, even if light of the wavelength at, for example, output port 113-1 is selected, part of the input to unselected output ports, such as 113-N, for example, ends up leaking. These phenomena are called inter-port crosstalk, and it is desirable if they are as low as possible. When optical switches are used at the nodes of an optical communications system, inter-port crosstalk must be at least 30 dB, preferably at least 40 dB.

Next, the causes of inter-port crosstalk will be described. In a space phase modulator that uses a multi-level optical phased array, high-order diffraction is seen at equal spacing regardless of the order of diffraction. For example, as shown in FIG. 2, if the angle of incidence of incident light on a space phase modulator 120 such as an LCOS element is taken as $\theta_{in}$, then the angle of emergence of specular-reflected 0-order diffracted light $L_0$ is $-\theta_{in}$. Then, if the deflection angle of $1^{st}$-order diffracted light $L_1$ from 0-order light is taken as $\theta$, then reflected light of the maximum level is obtained in the $1^{st}$-order diffracted light, but this and diffracted light of $n\theta$ (n is an integer) at equal angle spacing are seen—that is, high-order diffracted light $L_2, L_3 \ldots$ of $2^{nd}$-order, $3^{rd}$-order $\ldots$ and high-order diffracted light $L_1, L_2 \ldots$ of $-1^{st}$-order, $-2^{nd}$-order $\ldots$ are seen. Therefore, if there is an optical axis or optical fiber for receiving light at the position where these diffracted lights are received, inter-port crosstalk ends up occurring.

FIG. 3 is a drawing illustrating the cross-section of an LCOS element, which is configured by laminating, in the direction perpendicular to the incidence face from the face on which light is incident, an AR layer 131, a glass layer 132, a transparent common electrode 133, a liquid crystal 134, numerous back face reflection electrodes 135 and a silicon layer 136. Here, light that is incident at an angle of incidence $\theta_{in}$ from the AR layer 131 passes through a light guide not illustrated in the drawing, and is incident on the reflection layer 135 from the liquid crystal layer 134. This angle is taken as $a\theta_{in}$ (a is a constant). At this time, it is reflected at a diffraction angle that depends on the voltage applied to each electrode. If the angle of reflection is taken as $a(\theta_{in}+\theta)$, then the reflected light passes through the AR layer 131 and is output to the exterior. The angle of emergence of this reflected light is $\theta_{in}+\theta$. However, some of the reflected light is reflected by the face of the common electrode layer 133, and passes through the liquid crystal layer 134 and is again reflected by the reflection layer 135 and output to the exterior. The angle of emergence of this reflected light is $\theta_{in}+2\theta$. Because this is repeated, high-order reflected light is obtained, and the angle difference of the high-order reflected light is an integral multiple of $\theta$. This is called Fresnel reflected light.

That is to say, high-order diffracted components and Fresnel reflected light components are periodically seen at the same angle. These reflected lights are a cause of inter-port crosstalk.

SUMMARY OF THE INVENTION

One or more embodiments of the present invention reduce the effect of crosstalk due to high-order diffracted components and Fresnel reflected light components.

In one aspect, the a wavelength selective optical switch according to one or more embodiments of the present invention comprises: an incidence/emergence unit that includes an input port at which signal light made up of light of numerous wavelengths is incident and an output port at which light signals of selected wavelengths are emergent; a wavelength dispersion element that spatially disperses signal light according to a wavelength of the signal light, and synthesizes reflected light; a condenser element that condenses light dispersed by the wavelength dispersion element on a two-dimensional plane; a space phase modulator arranged so as to receive incident light deployed on an xy plane made up of an x-axis direction deployed according to wavelength and a y-axis direction orthogonal to the x-axis direction, and having numerous pixels arranged in a lattice on the xy plane, and uses a multi-level optical phased array that periodically changes a phase shift quantity in the y-axis direction for the pixels on the x-axis in a saw tooth waveform; and a space phase modulator drive unit that drives electrodes of the pixels arrayed in the xy axial directions of the space phase modulator, and reflects light of each wavelength respectively in a plurality of directions. In one or more embodiments, the incidence/emergence unit includes a plurality of input ports and output ports, and when one output port is arranged at a position at which light entering from one input port and reflected from the space phase modulator is incident, other input ports and output ports are arranged at positions that do not correspond to high-order diffracted light thereof.

In one or more embodiments, when a 0-order diffracted light obtained by spectral reflection of light incident on the space phase modulator from one of the input ports is taken as a reference, if an angle of reflection at which the light is incident on one of the output ports is taken as $\theta_N$, then an angle of reflection $\theta_M$ at which the light is incident on all the other output ports is arranged at a position such that $p\cdot\theta_N+\Delta\theta<\theta_M<(p+1)\theta_N-\Delta\theta$, where p is an integer, and, if a focal length of a condenser lens is taken as f and a beam diameter of a light beam at a position of incidence on the output ports is taken as $\phi$, $\Delta\theta$ is $\phi/2f$ or less.

In one or more embodiments, when a 0-order diffracted light obtained by spectral reflection of light incident on the space phase modulator from one of the input ports is taken as a reference, if an angle of reflection at which the light is incident on one of the output ports is taken as $\theta_N$, then an angle of reflection $\theta_M$ at which the light is incident on that output port from all the other input ports is arranged at a position such that $p\cdot\theta_N+\Delta\theta<\theta_M<(p+1)\theta_N-\Delta\theta$, where p is an integer, and, if a focal length of the condenser lens is taken as f and a beam diameter of a light beam at a position of incidence on the output ports is taken as $\phi$, $\Delta\theta$ is $\phi/2f$ or less.

In one or more embodiments, when a 0-order diffracted light obtained by spectral reflection of light incident on the space phase modulator from one of the input ports is taken as a reference, if an angle of reflection at which the light is incident on one certain output port is taken as $\theta_N$, and an angle of incident light is taken as $\theta_0$ with 0-order diffracted light as a reference, then reflected light is received whose angle of reflection at which the light is incident on all the other output ports is in a range of $\theta_0/2<\theta_N<\theta_0$.

In one or more embodiments, when a 0-order diffracted light obtained by spectral reflection of light incident on the space phase modulator from one of the input ports is taken as a reference, if an angle of reflection at one of the output ports is taken as $\theta_N$, and an angle of incident light is taken as $\theta_0$ with 0-order diffracted light as a reference, then reflected light is received whose angle of reflection at which the light is incident on that output port from all the other input ports is in the range of $\theta_0/2<\theta_N<\theta_0$.

In one or more embodiments, a bidirectional spacing d between said optical fiber and microlens is 125 μm or less.

In one or more embodiments, it may be configured such that said input ports and output ports serve as a planar light-wave circuit.

In one or more embodiments, the input ports have a plurality of microlenses and optical fibers positioned on a central axis of the respective microlenses, and when the effective diameter of the microlenses is taken as $\phi$ and spacing of adjacent microlenses is taken as d, a lens array is arranged such that $\phi<d$.

In one or more embodiments, the space phase modulator is an LCOS element having numerous pixels arrayed in two dimensions, and the space phase modulator drive unit controls the voltage applied to each pixel according to wavelength selection characteristics.

In one or more embodiments, the space phase modulator is a liquid crystal element having numerous pixels arrayed in two dimensions, and the space phase modulator drive unit controls the voltage applied to each pixel according to wavelength selection characteristics.

According to one or more embodiments the present invention, in an optical switch that performs wavelength selection using a multi-level optical phased array, output ports can be provided at positions that tend not to produce crosstalk between ports, and crosstalk occurring at the output ports can be greatly reduced. Therefore, the effect of greatly improving optical switching quality is obtained.

DETAILED DESCRIPTION OF THE INVENTION

First Embodiment

Figure 1A:
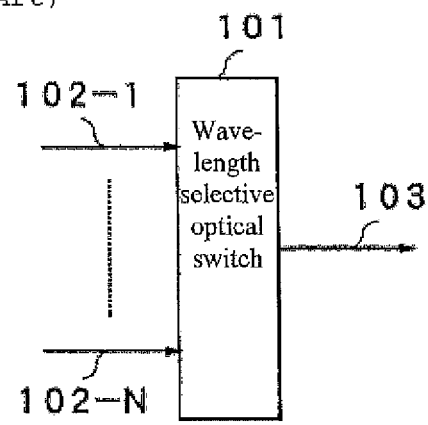
FIGS. 1(a)-(b) show a schematic diagram illustrating a conventional wavelength selective optical switch.
Figure 1B:
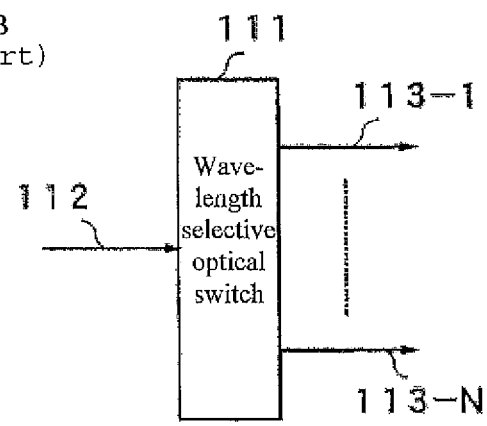
Figure 2:
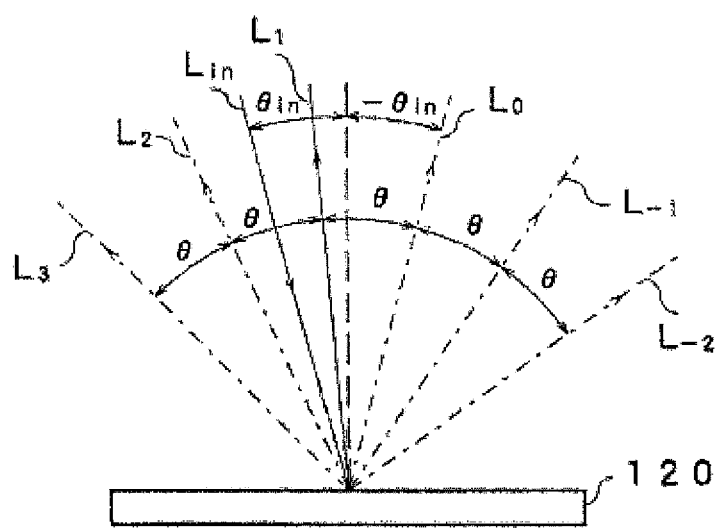
FIG. 2 is a drawing illustrating angles of high-order diffracted light.
Figure 3:
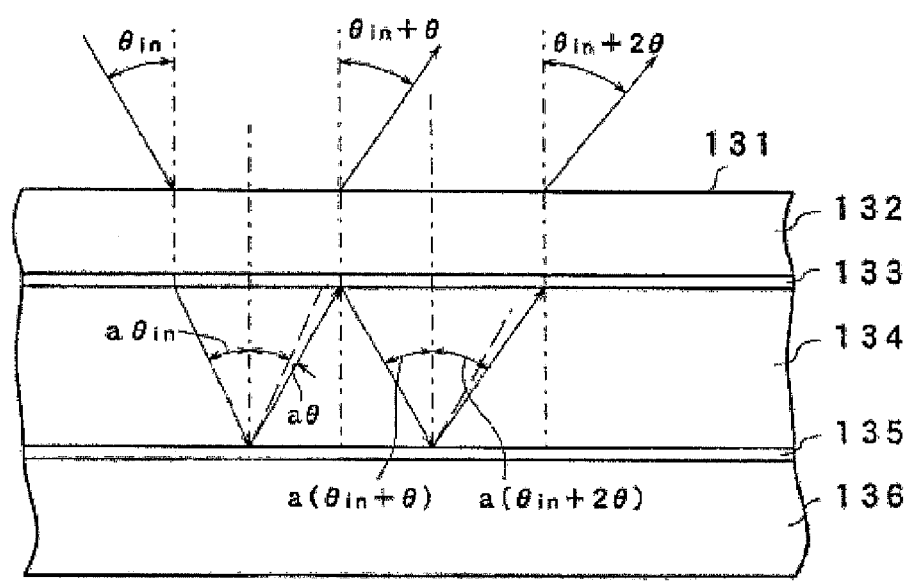
FIG. 3 is a drawing illustrating the state of Fresnel reflection in an LCOS element.
Figure 4A:
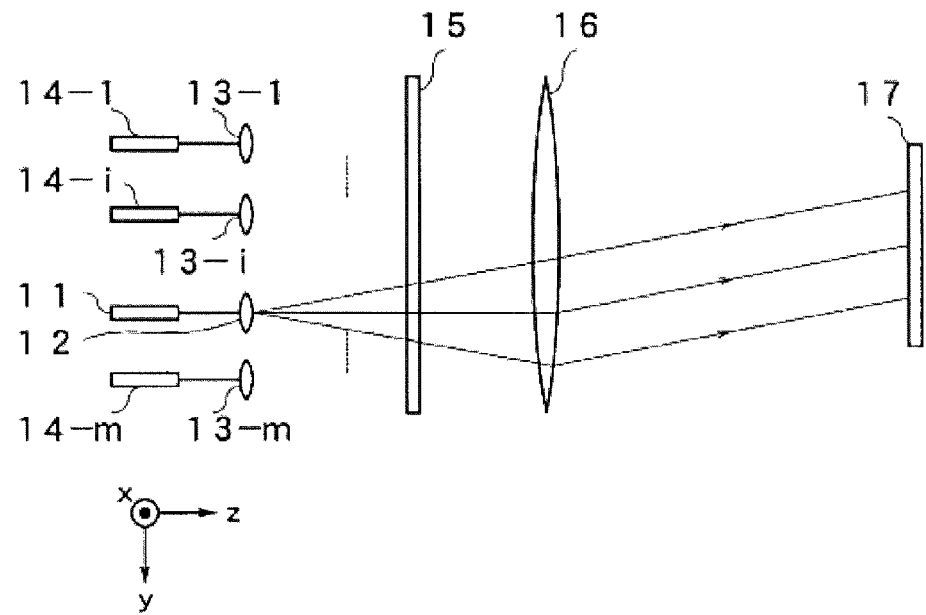
FIG. 4A is a drawing illustrating the optical layout of a reflective wavelength selective optical switch according to a first embodiment of the present invention, as seen from the x-axis direction.
Figure 4B:
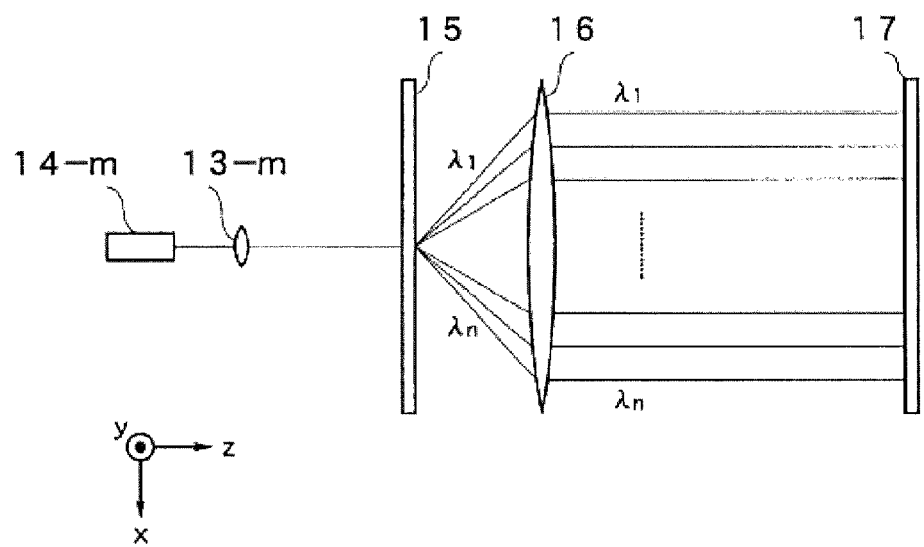
FIG. 4B is a drawing illustrating the optical layout of the reflective wavelength selective optical switch according to the first embodiment of the present invention, as seen from the y-axis direction.

FIG. 4A is a side view illustrating the structure of the optical layout of a reflective wavelength selective optical switch according to a first embodiment of the present invention, as seen from the x-axis direction, and FIG. 4B is a side view thereof seen from the y-axis direction. The incident light is WDM signal light in which light signals of wavelengths $\lambda_1$-$\lambda_n$ are multiplexed. The WDM light is respectively output via an optical fiber 11 to a collimator lens 12. The collimator lens 12 focuses the light in the x direction and y direction and outputs it, and its center line is also illustrated in FIG. 4A. Also, light incident on collimator lenses 13-1 through 13-$m$ is output to the exterior from optical fibers 14-1 through 14-$m$ arranged in parallel to the optical fiber 11. Here, m is a natural number. Here, the optical fiber 11 and collimator lens 12 constitute an input port, and the optical fibers 14-1 through 14-$m$ and collimator lenses 13-1 through 13-$m$ constitute a plurality of output ports. A wavelength dispersion element 15 disperses light into different directions on the xz plane according to wavelength. Here, as the wavelength dispersion element 15, a diffraction grating may be used, or a prism or the like may be used. A configuration in which a diffraction grating and a prism are combined may also be used. Light dispersed by this wavelength dispersion element 15 is provided to a lens 16 which is a condenser element. The lens 16 is a condenser element that condenses light dispersed on the xz plane to be parallel to the z-axis direction as shown in FIG. 4B, and the condensed light is incident on a space phase modulator 17, which functions as a diffraction grating.

Note that an example of light of maximum wavelength $\lambda_1$ and minimum wavelength $\lambda_n$ is illustrated in FIG. 4B, but since the incident light is WDM signal light having numerous spectra from $\lambda_1$ to $\lambda_n$, the WDM signal light developed along the xz plane is applied to the space phase modulator 17 in the form of bands. The space phase modulator 17 changes the direction of the incident light for each wavelength and reflects it, and the light filter selection characteristics are determined by its reflection characteristics, but details will be described later. The light reflected by the space phase modulator 17 passes through the same path and is applied to the lens 16, and is again applied to the wavelength dispersion element 15. The wavelength dispersion element 15 focuses the reflected light in the same direction as the original incident light, and converts it to light parallel to the z axis, which is output via the collimator lenses 13-1 through 13-$m$ and the respective optical fibers 14-1 through 14-$m$. Here, the optical fibers 11 and 14-1 through 14-$m$ and the collimator lenses 12 and 13-1 through 13-$m$ constitute ports for input and output which input WDM signal light and output selected light, and together they serve as an incidence/emergence unit. In this embodiment, the optical fiber 11 and collimator lens 12 serve as an input port and the others serve as output ports, but these can be modified as appropriate. There may also be a plurality of input ports and one output port. In this case, the light applied to the input ports is light of all wavelength components of WDM light, and it is synthesized by the output port.

(Configuration of Space Phase Modulator)

Next, the space phase modulator 17 used in the wavelength selective optical switch according to the first embodiment will be described here. In the first embodiment, incident light is dispersed on the xz plane according to wavelength, and when it is incident on the space phase modulator 17, that incidence region is the rectangular region R shown in FIG. 5. Then, in the wavelength selective optical switch of the first embodiment, light of any wavelength can be selected by selecting the direction of reflection for each wavelength. A setting unit 20 is connected to the space phase modulator 17 via a driver 21. The setting unit 20 determines the pixels that reflect or transmit light of the xy plane according to selected wavelength, as will be described later. The driver 21 includes a D/A converter that converts an input digital signal to voltage applied to the pixels. The setting unit 20 and driver 21 constitute a space phase modulator drive unit, which controls the characteristics of pixels at prescribed positions in the x-axis and y-axis directions by driving the electrodes of the pixels of the space phase modulator 17 arrayed in the xy directions.

Figure 6A:
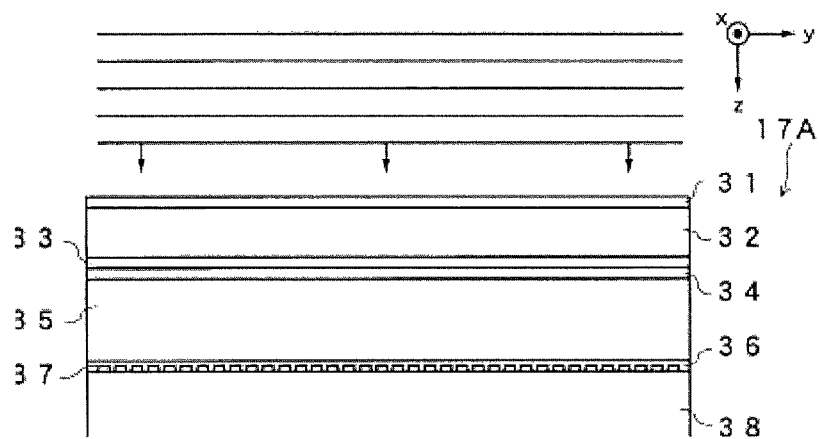
FIGS. 6A and B illustrate the structure of the space phase modulator of the wavelength selective optical switch according to the first embodiment of the present invention and incidence of light on the space phase modulator.

Next, the detailed configuration of the space phase modulator 17 will be described. The space phase modulator 17 can be realized using an LCOS (liquid crystal on silicon) liquid crystal element. Since the LCOS element 17A has a liquid crystal modulation driver built into the back of each pixel, the number of pixels can be increased. For example, it can be configured from 1920×1080 pixels in lattice form. FIG. 6A is a schematic diagram illustrating the LCOS element 17A, which is configured by laminating, along the z axis from the plane on which light is incident, an AR layer 31, a glass layer 32, a transparent common electrode 33, an alignment layer 34, a liquid crystal 35, an alignment layer 36 which contains numerous back face reflection electrodes 37, and a silicon layer 38.

Figure 5:
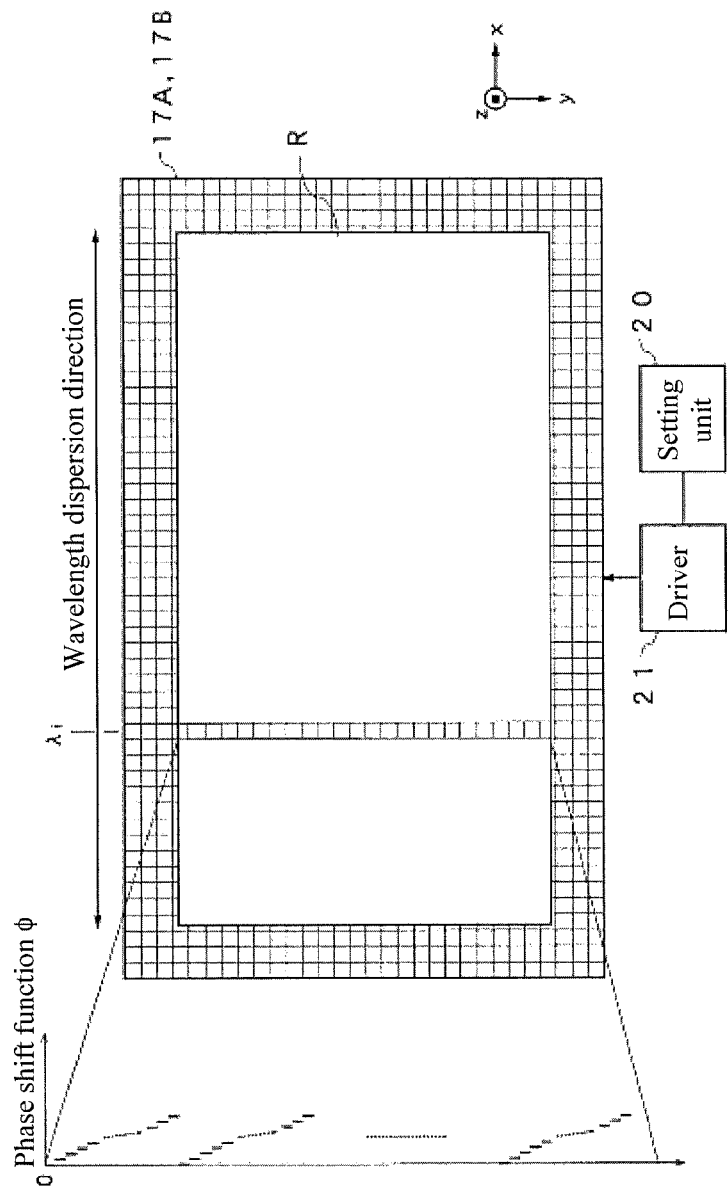
FIG. 5 is a drawing illustrating a two-dimensional space phase modulator used in the wavelength selective optical switch according to the first embodiment of the present invention.
Figure 6B:
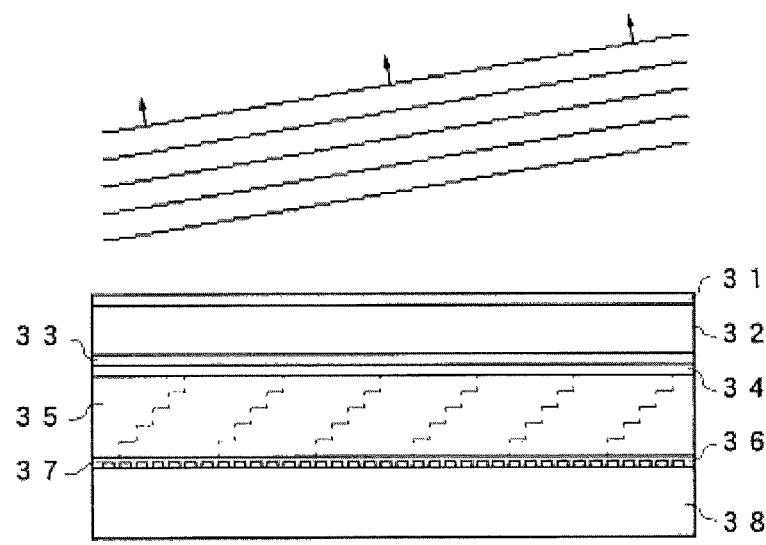
Figure 7:
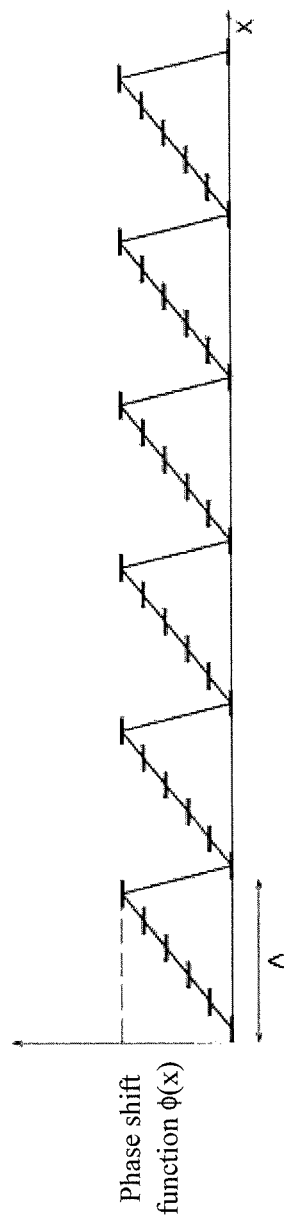
FIG. 7 is a drawing illustrating the relationship between incidence position and phase shift of an LCOS element according to this embodiment.

In the LCOS element 17A, a light beam is incident at a different position for each wavelength. That is, the light applied to the incidence region is light obtained by developing WDM light on the xy plane according to wavelength band $\lambda_i$ (i=1 to n). Here, if the wavelength dispersion direction is taken as the x-axis direction shown in FIG. 5, numerous pixels lined up in the y-axis direction correspond to the respective wavelengths. Thus, by periodically providing a different voltage to the numerous y-direction pixels of the LCOS element 17A on which light of a certain wavelength $\lambda_i$ is incident, the step-like phase shift function shown in FIG. 5 is exhibited, and overall, changes in refractive index resulting in a saw tooth shape can be realized. FIG. 7 is a drawing illustrating the relationship between this phase shift function and the incidence position of light. In FIG. 7, the phase shift quantity is changed in a step-wise manner by a plurality of pixels, in this case six pixels, and by repeating this change periodically, a function similar to a blazed diffraction grating can be realized. Note that in the drawing, the linear saw tooth wave shows the case of a blazed diffraction grating, and the step-like waveform shows the case of an LCOS element having numerous levels. Thus, a multi-level optical phased array can be achieved by changing the refractive index, and the reflection direction can be made to differ, as shown in FIG. 6B for example, by the diffraction phenomenon. Here, by appropriately selecting the phase shift function, the refraction angle of incident light can be changed to different directions for each wavelength, and therefore, the LCOS element can be thought of as a characteristics variable diffraction grating. Therefore, by applying voltage between the transparent common electrode 33 and the back face reflection electrode 37, the diffraction angle of each wavelength component can be independently controlled, and input light of a specified wavelength can be reflected in a desired direction, the light of other wavelength components can be diffracted as unnecessary light, and light in non-emergent directions can be reflected.

Further, as a second example of the space phase modulator 17, a reflective type of liquid crystal element 17B having a two-dimensional electrode array which does not have an LCOS structure will be described. In the case of an LCOS element, a liquid crystal driver is built into the back face of the pixel, but in the two-dimensional electrode array liquid crystal 17B, a driver for liquid crystal modulation is provided outside the element. The configuration is otherwise the same as an LCOS element, and can be used to achieve the multi-level optical phased array described above.

The diffraction angle of a multi-level optical phased array is expressed by the following formula (1).

$$\sin\theta_{in} + \sin\theta_{diff} = m\cdot\lambda/\Lambda \tag{1}$$

Here,
q: Number of multi-levels,
m: Diffraction order,
λ: Wavelength,
Λ: Phased array pitch,
$\theta_{in}$: Angle of incidence, and
$\theta_{diff}$: Diffraction angle.

Figure 8:
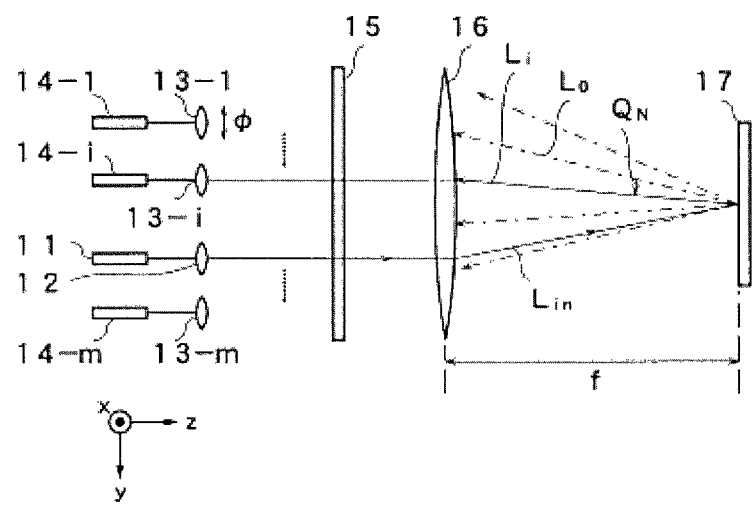
FIG. 8 is a drawing illustrating the relationship between angle of incidence and angle of reflection of the wavelength selective optical switch according to the first embodiment of the present invention.

Here, the layout of the input port and output ports and the angles of incidence and emergence at the space phase modulator 17 will be further described. In this embodiment, a plurality of output ports are provided with respect to an input port. As shown in FIG. 8, the output from the input port is incident on the space phase modulator 17. In FIG. 8, the incident light is indicated by one line $L_{in}$ in the center. For 0-order reflected light $L_0$, the angle of incidence and the angle of emergence are the same. The space phase modulator 17 is controlled by a multi-level optical phased array. With the angle of 0-order reflected light $L_0$ as a reference, the angle to the reflected light when controlled so that light of a certain wavelength is reflected to one output port is taken as $\theta_N$. At the output port positioned at the angle at which this $1^{st}$-order reflected light is received—for example, the output port of collimator lens 13-i and optical fiber 14-i—reflected light $L_i$ of the maximum level is obtained. Here, even in the case of Fresnel reflection as described above or even if it is a high-order diffracted light component, some of the reflected light of that wavelength is output at the angle indicated by the dash-dot line as well as at the positions at integral multiples of angle $\theta_N$ of 0-order reflected light and $1^{st}$-order reflected light. Therefore, if a port placed at an angle that receives specified $1^{st}$-order reflected light is used as an output port, it is possible to effectively reduce inter-port crosstalk by not arranging the other output ports at positions where the remaining reflected light appears. That is, with 0-order reflected light $L_0$ as a reference, the angle of reflected light $\theta_M$ incident on other output ports is assigned so that no other output ports are positioned within a tiny angle range of $p\theta_N \pm \Delta\theta$, where p is an integer. That is, the range of acceptable arrangement is expressed by the following formula.

$$p\cdot\theta_N + \Delta\theta < \theta_M < (p+1)\theta_N - \Delta\theta \tag{2}$$

The smaller Δθ the better, and 0 is best. Here, if the focal length of the lens 16 is taken as f and the beam diameter of the light beam at the position of incidence on all collimator lenses 13-1 through 13-m is taken as ϕ, then Δθ may be ϕ/2f or less. The angles of the respective output ports are set such that this relationship is satisfied between any output port and the output ports other than it. For example, when incident on an output port made up of the collimator lens 13-1 and optical fiber 14-1, if the angle between the 0-order reflected light and the line $L_1$ of its reflected light is taken as $\theta_1$, then the angle of reflection to output ports other than that is a value outside the range of $p\theta_1 \pm \Delta\theta$. By so doing, inter-port crosstalk can be effectively prevented.

Next, the case where the input ports and output ports are reversed will be described as a variation example of the first embodiment. In the case where a wavelength selective optical switch is configured from a plurality of input ports and one output port, when the 0-order diffracted light obtained by spectral reflection of light incident on the space phase modulator from one input port is taken as a reference, if the angle of reflection at which it is incident on the output port is taken as $\theta_N$, then the angle of reflection $\theta_M$ at which it is incident on that output port from all of the other input ports is assigned such that it is not positioned within a tiny angle range of $p\theta_N \pm \Delta\theta$, where p is an integer, and, if the focal length of the condenser lens 16 is taken as f and the beam diameter of the light beam at the incident position depending on the output port is taken as ϕ, Δθ is ϕ/2f or less. That is, the range of acceptable arrangement is expressed by formula (2) above.

Second Embodiment

Figure 9:
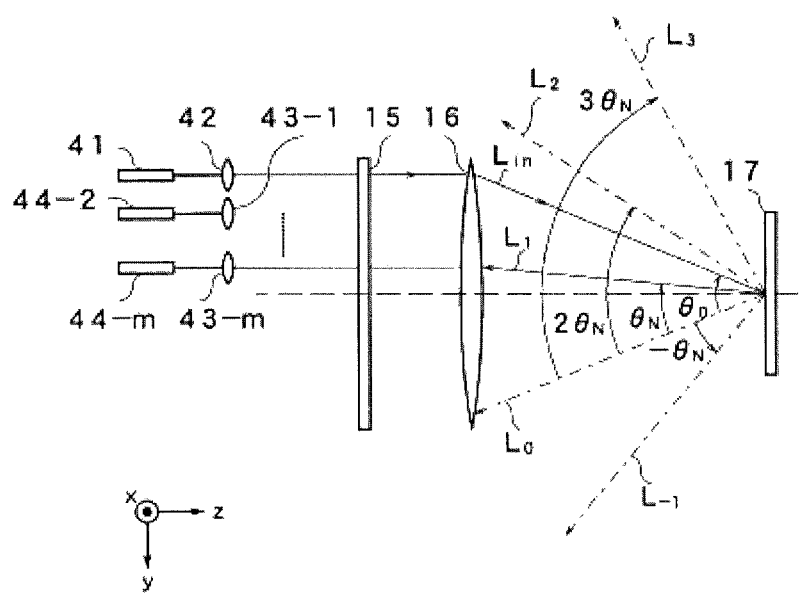
FIG. 9 is a drawing illustrating the optical layout of a wavelength selective optical switch according to a second embodiment of the present invention, as seen from the x-axis direction.

Crosstalk can be prevented by satisfying condition (2) of the first embodiment, but there are cases where it is not easy to set the output ports and input ports at positions that satisfy this condition. Thus, in a wavelength selective optical element according to a second embodiment, it is configured such that arranging the input/output ports is easy. FIG. 9 illustrates an input port and a plurality of output ports. Here, the input port is made up of an optical fiber 41 and a collimator lens 42, and the microlens array positioned to receive reflected light is made up of collimator lenses 43-1 through 43-m and optical fibers 44-1 through 44-m. The configuration beyond that is the same as the first embodiment, and therefore, a detailed description thereof is omitted. In this case as well, when light emergent from the input port is incident on the space phase modulator 17, the line of the incident light is taken as $L_{in}$, and its 0-order reflected light is indicated by line $L_0$. The angle between the line $L_0$ of 0-order reflected light and the line $L_{in}$ of incident light is taken as $\theta_0$. With line $L_0$ as a reference, the angle of line $L_1$ of $1^{st}$-order reflected light incident on one output port is taken as $\theta_N$. In this case, the $2^{nd}$-order diffracted light $L_2$, $3^{rd}$-order diffracted light $L_3$ . . . have angles of reflection of $2\theta_N$, $3\theta_N$ . . . . Also, the $-1^{st}$-order diffracted light $-L_1$, $-2^{nd}$-order diffracted light $-L_2$ . . . have angles of reflection of $-\theta_N$, $-2\theta_N$ . . . . Therefore, the angle with respect to line $L_0$ of light incident on all of the other output ports is arranged so as to satisfy the following condition.

$$\theta_0/2 < \theta_N < \theta_0 \tag{3}$$

By arranging the other output ports so as to meet the condition of formula (3), all output ports can easily be arranged so as to avoid inter-port crosstalk without taking into consideration formula (2) of the first embodiment. In this case, the obtained effect is that arrangement is very easy because the collimator lenses and optical fibers are arranged in proximity.

Next, the case where the input ports and output ports are reversed will be described as a variation example of the second embodiment. In this case, when the 0-order diffracted light obtained by spectral reflection of light incident on the space phase modulator from one input port is taken as a reference, if the angle of reflection to the output port is taken as $\theta_N$ and the angle of incident light with 0-order diffracted light as a reference is taken as $\theta_0$, then reflected light whose angle of reflection at which it is incident on that output port from all of the other input ports is in the range of $$\theta_0/2 < \theta_N < \theta_0$$

is received.

Third Embodiment

Figure 10:
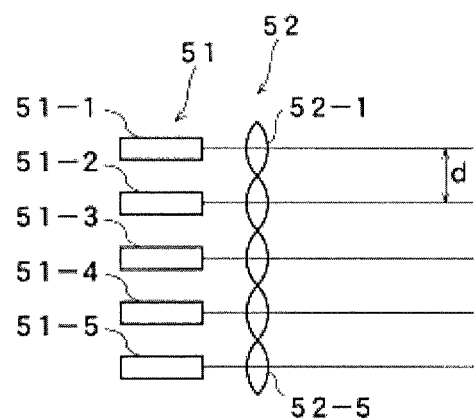
FIG. 10 is a drawing illustrating the relationship between the optical fiber array and the microlenses of a wavelength selective optical switch according to a third embodiment of the present invention.

Next, a third embodiment of the present invention will be described. The embodiment is basically the same as the first embodiment, and only the arrangement of input/output ports differs. FIG. 10 illustrates the arrangement of an optical fiber array 51 and microlens array 52 according to this embodiment. As the optical fibers, a fiber array in which numerous fibers 51-1, 51-2 . . . are integrated in parallel with the same spacing is used. As the collimator lenses, a microlens array in which numerous adjacent lenses 52-1, 52-2 . . . are integrated is used. To make the spacing of the fibers and lenses coincide with the optical axis, their spacing is set to be the same. Here, that spacing is taken as d. The spacing d of a microlens array is generally 125 µm or 250 µm. This is to align with the diameter of the core strands of widely-used optical fibers of 125 µm or the diameter of optical fiber crude strands of 250 µm, but in the third embodiment, this spacing d is determined as follows.

$$d<125 \text{ µm}$$

When the spacing d is determined in this manner, the optical fiber spacing of the optical fiber array 51 and the lens spacing of the microlens array 52 can be arranged more densely and the angle of deflection can be reduced. For example, a fiber array may be configured using optical fibers having a clad diameter of 80 µm. Also, spacing d can be set to 125 µm or less using a planar lightwave circuit PLC, and the input/output ports can be made into arrays.

Figure 11:
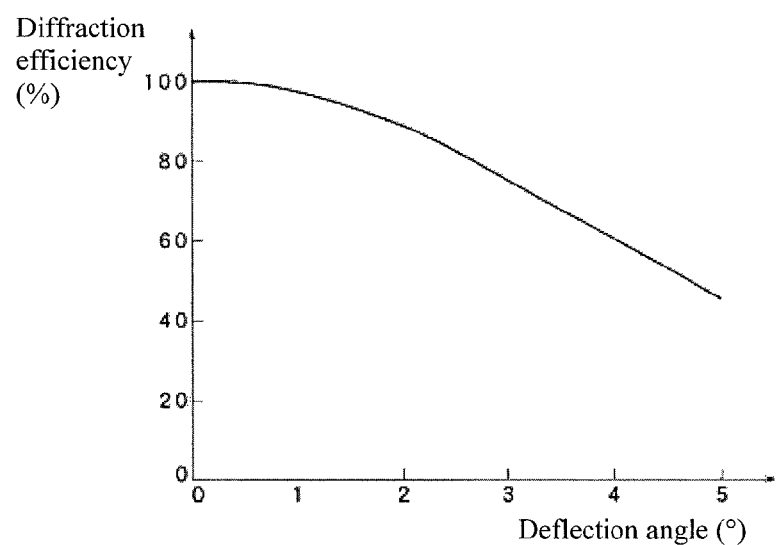
FIG. 11 is a graph illustrating the relationship between deflection angle and diffraction efficiency.

By so doing, it is possible to increase the number of ports because numerous input/output ports can be arranged with narrow spacing. FIG. 11 is a graph illustrating the relationship between deflection angle and diffraction efficiency. As shown in this drawing, the smaller the deflection angle, the higher the diffraction efficiency. Therefore, in this embodiment, the obtained effects are that numerous input/output ports can be arranged with narrow spacing and the number of ports can be increased, and diffraction efficiency can be improved.

Fourth Embodiment

Figure 12:
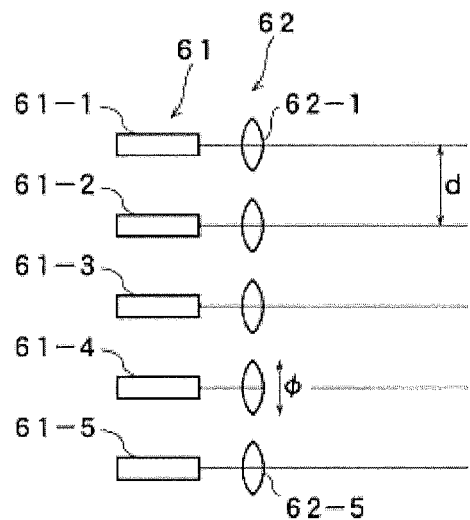
FIG. 12 is a drawing illustrating the relationship between the optical fiber array and the microlenses of a wavelength selective optical switch according to a fourth embodiment of the present invention.
Figure 13:
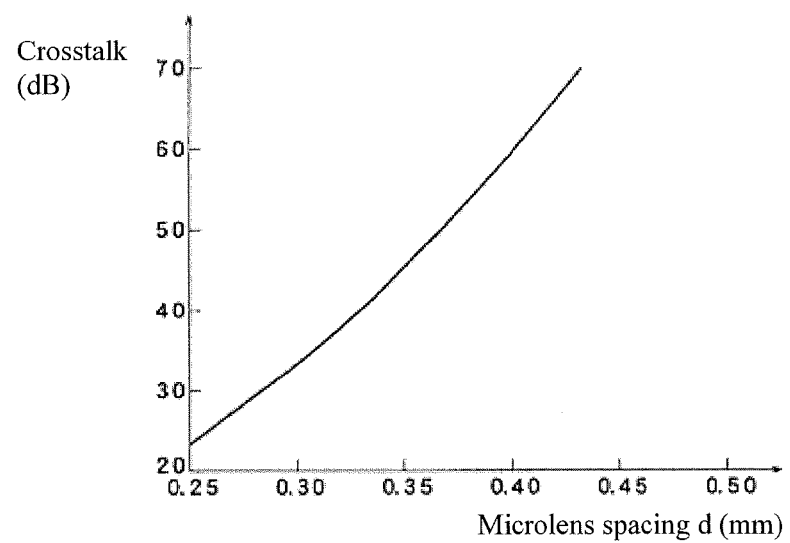
FIG. 13 is a graph illustrating the relationship between microlens spacing and crosstalk according to the fourth embodiment.

Next, a fourth embodiment of the present invention will be described. In this embodiment as well, only the input/output ports are illustrated in FIG. 12. The configuration beyond that is the same as the first embodiment, and therefore, a detailed description thereof is omitted. In this embodiment, as shown in FIG. 12, the spacing between adjacent microlens arrays is taken as d. If the effective region diameter of each microlens is taken as $\phi$, the microlens spacing d is set to be larger than the diameter $\phi$ ($\phi>d$). FIG. 13 is a graph illustrating the relationship between microlens spacing d and crosstalk. The larger the spacing d, the greater the decrease in crosstalk. That is, crosstalk performance can be improved by making the effective diameter of each lens of the microlens array smaller than the lens spacing, when making it so that these reflected lights are incident on the center of the lens in order to make sure high-order diffracted light and Fresnel reflected light components are not incident on the optical fiber array to the extent possible.

Although the disclosure has been described with respect to only a limited number of embodiments, those skilled in the art, having benefit of this disclosure, will appreciate that other embodiments can be devised which do not depart from the scope of the present disclosure. Accordingly, the scope of the present disclosure should be limited only by the attached claims. According to one or more embodiments of the present invention as described in detail above, it is possible to reduce inter-port crosstalk by appropriately setting the angle of output ports which receive reflected light and transmitted light from a space phase modulator. As a result, the wavelength selective optical switch can be used as a key constituent element of WDM light nodes having add and drop functions.

DESCRIPTION OF REFERENCE NUMERALS 11, 14-1 through 14-$m$ Optical fibers
12, 13-1 through 13-$m$ Collimator lenses
16, 18 Lens
15 Wavelength dispersion element
17 Space phase modulator
17A LCOS element
17B 2-D electrode array liquid crystal element
20 Setting unit
21 Driver

What is claimed is:

1. A wavelength selective optical switch comprising:
an incidence/emergence unit that includes an input port at which signal light made up of light of numerous wavelengths is incident and an output port at which light signals of selected wavelengths are emergent;
a wavelength dispersion element that spatially disperses signal light according to a wavelength of the signal light, and synthesizes reflected light;
a condenser element that condenses light dispersed by the wavelength dispersion element on a two-dimensional plane;
a space phase modulator arranged so as to receive incident light deployed on an xy plane made up of an x-axis direction deployed according to wavelength and a y-axis direction orthogonal to the x-axis direction, and having numerous pixels arranged in a lattice on the xy plane, and uses a multi-level optical phased array that periodically changes a phase shift quantity in the y-axis direction for the pixels on the x-axis in a saw tooth waveform; and
a space phase modulator drive unit that drives electrodes of the pixels arrayed in the xy axial directions of the space phase modulator, and reflects light of each wavelength respectively in a plurality of directions,
wherein the incidence/emergence unit includes a plurality of input ports and output ports, and when one output port is arranged at a position at which light entering from one input port and reflected from the space phase modulator is incident, other input ports and output ports are arranged at positions that do not correspond to high-order diffracted light thereof.

2. The wavelength selective optical switch according to claim 1, wherein
when a 0-order diffracted light obtained by spectral reflection of light incident on the space phase modulator from one of the input ports is taken as a reference, if an angle of reflection at which the light is incident on one of the output ports is taken as $\theta_N$, then an angle of reflection $\theta_M$ at which the light is incident on all the other output ports is arranged at a position such that $$p \cdot \theta_N + \Delta\theta < \theta_M < (p+1)\theta_N - \Delta\theta,$$

where p is an integer, and, if a focal length of a condenser lens is taken as f and a beam diameter of a light beam at a position of incidence on the output ports is taken as $\phi$, $\Delta\theta$ is $\phi/2f$ or less.

3. The wavelength selective optical switch according to claim 2, wherein
the space phase modulator is an LCOS element having numerous pixels arrayed in two dimensions, and the space phase modulator drive unit controls the voltage applied to each pixel according to wavelength selection characteristics.

4. The wavelength selective optical switch according to claim 2, wherein
the space phase modulator is a liquid crystal element having numerous pixels arrayed in two dimensions, and
the space phase modulator drive unit controls the voltage applied to each pixel according to wavelength selection characteristics.

5. The wavelength selective optical switch according to claim 1, wherein
when a 0-order diffracted light obtained by spectral reflection of light incident on the space phase modulator from one of the input ports is taken as a reference, if an angle of reflection at which the light is incident on one of the output ports is taken as $\theta_N$, then an angle of reflection $\theta_M$ at which the light is incident on that output port from all the other input ports is arranged at a position such that $$p \cdot \theta_N + \Delta\theta \theta_M < (p+1)\theta_N - \Delta\theta,$$

where p is an integer, and, if a focal length of the condenser lens is taken as f and a beam diameter of a light beam at a position of incidence on the output ports is taken as $\phi$, $\Delta\theta$ is $\phi/2f$ or less.

6. The wavelength selective optical switch according to claim 5, wherein
the space phase modulator is an LCOS element having numerous pixels arrayed in two dimensions, and
the space phase modulator drive unit controls the voltage applied to each pixel according to wavelength selection characteristics.

7. The wavelength selective optical switch according to claim 5, wherein
the space phase modulator is a liquid crystal element having numerous pixels arrayed in two dimensions, and
the space phase modulator drive unit controls the voltage applied to each pixel according to wavelength selection characteristics.

8. The wavelength selective optical switch according to claim 1, wherein
when a 0-order diffracted light obtained by spectral reflection of light incident on the space phase modulator from one of the input ports is taken as a reference, if an angle of reflection at which the light is incident on one certain output port is taken as $\theta_N$, and an angle of incident light is taken as $\theta_0$ with 0-order diffracted light as a reference, then reflected light is received whose angle of reflection at which the light is incident on all the other output ports is in a range of $\theta_0/2 < \theta_N < \theta_0$.

9. The wavelength selective optical switch according to claim 8, wherein
the space phase modulator is an LCOS element having numerous pixels arrayed in two dimensions, and
the space phase modulator drive unit controls the voltage applied to each pixel according to wavelength selection characteristics.

10. The wavelength selective optical switch according to claim 8, wherein
the space phase modulator is a liquid crystal element having numerous pixels arrayed in two dimensions, and
the space phase modulator drive unit controls the voltage applied to each pixel according to wavelength selection characteristics.

11. The wavelength selective optical switch according to claim 1, wherein
when a 0-order diffracted light obtained by spectral reflection of light incident on the space phase modulator from one of the input ports is taken as a reference, if an angle of reflection at one of the output ports is taken as $\theta_N$, and an angle of incident light is taken as $\theta_0$ with 0-order diffracted light as a reference, then reflected light is received whose angle of reflection at which the light is incident on that output port from all the other input ports is in the range of $\theta_0/2 < \theta_N < \theta_0$.

12. The wavelength selective optical switch according to claim 11, wherein
the space phase modulator is an LCOS element having numerous pixels arrayed in two dimensions, and
the space phase modulator drive unit controls the voltage applied to each pixel according to wavelength selection characteristics.

13. The wavelength selective optical switch according to claim 1, wherein a bidirectional spacing d between the optical fiber and a microlens is 125 μm or less.

14. The wavelength selective optical switch according to claim 1, wherein the input ports and output ports serve as a planar lightwave circuit.

15. The wavelength selective optical switch according to claim 1, wherein
the input ports have a plurality of microlenses and optical fibers positioned on a central axis of the respective microlenses, and
when the effective diameter of the microlenses is taken as $\phi$ and spacing of adjacent microlenses is taken as d, a lens array is arranged such that $\phi < d$.

16. The wavelength selective optical switch according to claim 1, wherein
the space phase modulator is an LCOS element having numerous pixels arrayed in two dimensions, and
the space phase modulator drive unit controls the voltage applied to each pixel according to wavelength selection characteristics.

17. The wavelength selective optical switch according to claim 1, wherein
the space phase modulator is an LCOS element having numerous pixels arrayed in two dimensions, and
the space phase modulator drive unit controls the voltage applied to each pixel according to wavelength selection characteristics.

18. The wavelength selective optical switch according to claim 1, wherein
the space phase modulator is a liquid crystal element having numerous pixels arrayed in two dimensions, and
the space phase modulator drive unit controls the voltage applied to each pixel according to wavelength selection characteristics.

19. The wavelength selective optical switch according to claim 1, wherein
the space phase modulator is a liquid crystal element having numerous pixels arrayed in two dimensions, and
the space phase modulator drive unit controls the voltage applied to each pixel according to wavelength selection characteristics.

* * * * *